United States Patent
Li (10) Patent No.: US 12,127,240 B2
(45) Date of Patent: Oct. 22, 2024

(54) METHODS AND APPARATUSES FOR TRIGGERING BANDWIDTH PART HANDOVER, AND METHODS AND APPARATUSES FOR INFORMATION CONFIGURATION

(71) Applicant: BEIJING XIAOMI MOBILE SOFTWARE CO., LTD., Beijing (CN)

(72) Inventor: Mingju Li, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 694 days.

(21) Appl. No.: 17/277,726

(22) PCT Filed: Sep. 21, 2018

(86) PCT No.: PCT/CN2018/107057
§ 371 (c)(1),
(2) Date: Mar. 18, 2021

(87) PCT Pub. No.: WO2020/056745
PCT Pub. Date: Mar. 26, 2020

(65) Prior Publication Data
US 2021/0274514 A1 Sep. 2, 2021

(51) Int. Cl.
*H04W 36/00* (2009.01)
*H04W 36/24* (2009.01)
(Continued)

(52) U.S. Cl.
CPC ........... *H04W 72/56* (2023.01); *H04W 36/24* (2013.01); *H04W 74/0808* (2013.01)

(58) Field of Classification Search
CPC ............. H04W 36/00; H04W 36/0005; H04W 36/0083; H04W 36/00837; H04W 36/24;
(Continued)

(56) References Cited

U.S. PATENT DOCUMENTS

| 9,860,836 B2 * | 1/2018 | Mochizuki ............ H04W 48/16 |
| 2018/0049203 A1 | 2/2018 | Xue et al. |

(Continued)

FOREIGN PATENT DOCUMENTS

| CN | 107251638 A | 10/2017 |
| CN | 107835516 A | 3/2018 |

(Continued)

OTHER PUBLICATIONS

The State Intellectual Property Office of the People's Republic of China, Office Action and Search Report Issued in Application No. 201880001877.9, dated Oct. 9, 2022, with Machine English Translation, (16p).

(Continued)

*Primary Examiner* — Alpus Hsu
(74) *Attorney, Agent, or Firm* — Arch & Lake LLP (57) ABSTRACT

Provided are methods and apparatuses for triggering bandwidth part (BWP) handover, information configuring methods and apparatuses, user equipment (UE), base stations, and computer-readable storage media. The method of triggering a BWP handover includes that a UE detects that a channel on an activated BWP for the UE is busy and the UE automatically hands over to a BWP for the UE other than the activated BWP to receive data.

10 Claims, 6 Drawing Sheets

Detect that the channel on an activated BWP for the UE is busy — S101

Automatically handing over to other BWP to receive data — S102

(51) Int. Cl.
*H04W 72/56* (2023.01)
*H04W 74/08* (2024.01)
*H04W 74/0808* (2024.01)

(58) Field of Classification Search
CPC ............................ H04W 72/56; H04W 72/566; H04W 74/0808
See application file for complete search history.

(56) References Cited

U.S. PATENT DOCUMENTS

| | | | |
|---|---|---|---|
| 2018/0220462 | A1 | 8/2018 | Kusashima et al. |
| 2019/0090299 | A1* | 3/2019 | Ang .................. H04W 52/0229 |
| 2019/0215870 | A1* | 7/2019 | Babaei .................. H04L 5/0092 |
| 2019/0230685 | A1* | 7/2019 | Park ...................... H04W 72/12 |
| 2019/0261244 | A1* | 8/2019 | Jung .................. H04W 36/305 |
| 2020/0106573 | A1* | 4/2020 | Cirik ................ H04W 74/0808 |
| 2020/0236677 | A1* | 7/2020 | Cui ........................ H04W 16/14 |
| 2020/0344030 | A1* | 10/2020 | Cheng .................. H04W 76/30 |
| 2020/0344649 | A1* | 10/2020 | Xu .................... H04W 36/0083 |
| 2020/0404673 | A1* | 12/2020 | Zhu ........................ H04L 5/003 |

FOREIGN PATENT DOCUMENTS

| | | |
|---|---|---|
| CN | 108496385 A | 9/2018 |
| CN | 108521850 A | 9/2018 |
| CN | 109803395 A | 5/2019 |
| EP | 3706483 A1 | 9/2020 |
| WO | 2018121621 A1 | 7/2018 |
| WO | 2018128439 A1 | 7/2018 |

OTHER PUBLICATIONS

International Search Report issued in PCT Application No. PCT/CN2018/107057, Apr. 28, 2019 with English translation, (4p).
Vivo, "Potential solutions and techniques for NR unlicensed spectrum", 3GPP TSG RAN WG1 Meeting #92, R1-1801557, Athens, Greece, Feb. 26-Mar. 2, 2018, (6p).
InterDigital Inc., "BWP operation in unlicensed spectrum", 3GPP RAN WG1, R1-1804680, Meeting #92bis, Sanya, China, Apr. 16-20, 2018, (4p).
European Patent Office, Extended European Search Report Issued in Application No. 18934302.3 dated Apr. 4, 2022, (14p).
ISA State Intellectual Property Office of the People's Republic of China, Written Opinion of the International Searching Authority issued in Application No. PCT/CN2018/107057, Apr. 28, 2019, WIPO, (8p).
Intel Corporation, "Configured UL grant enhancement for NR Unlicense", 3GPP TSG-RAN WG2103, R2-1812245, Gothenburg, Sweden, Aug. 20-24, 2018, (4p).
Vivo, "Discussion on the channel access procedures", 3GPP TSG RAN WG1, R1-1808237, Meeting #94 Gothenburg, Sweden, Aug. 20-24, 2018, (6p).
Vivo, "Discussion on the channel access procedures", 3GPP TSG RAN WG1 Meeting #93, R1-1806086, Busan, Korea, May 21-25, 2018, (5p).
Vivo, "Discussion on the channel access procedures", 3GPP TSG RAN WG1, Meeting #92bis, R1-1803857, Sanya, China, Apr. 16-20, 2018, (5p).
ZTE, Sanechips, "Considering on the RA triggered BWP switch in case SUL is configured", R2-1811480, 3GPP TSG-RAN WG2 Meeting #103 Gothenburg, Sweden, Aug. 20-24, 2018, 4 pages.
ZTE Corporation, "Consideration on the UE autonomous BWP switch", R2-1712433, 3GPP TSG-RAN WG2 Meeting #100 Reno, USA, Nov. 27-Dec. 1, 2017, 5 pages.

* cited by examiner

METHODS AND APPARATUSES FOR TRIGGERING BANDWIDTH PART HANDOVER, AND METHODS AND APPARATUSES FOR INFORMATION CONFIGURATION

CROSS-REFERENCE TO RELATED APPLICATION

This application is the U.S. national phase application of International Application No. PCT/CN2018/107057, filed on Sep. 21, 2018, the entire contents of which are incorporated herein by reference for all purposes.

TECHNICAL FIELD

The present disclosure relates to the technical field of communications, and in particular, to methods and apparatuses for triggering bandwidth part (BWP) handover, information configuring methods and apparatuses, user equipment, base stations, and computer-readable storage media.

BACKGROUND

In the Long Term Evolution (LTE for short) unlicensed spectrum, before the unlicensed spectrum is used, Listen Before Talk (LBT for short) channel detection is performed. The unlicensed spectrum cannot be accessed until the channel is detected to be idle. However, in the LTE phase, since the unlicensed spectrum, together with the licensed spectrum, mainly uses carrier aggregation, system information, Physical Downlink Control Channel (PDCCH for short) and the like may be sent on the licensed spectrum. Even if the channel on the unlicensed spectrum is not idle, a great influence will not be brought.

On a New Radio (NR for short) unlicensed spectrum, the unlicensed spectrum of the NR needs to support Stand Alone (SA for short), that is, all system information, PDCCH, etc. need to be sent on the unlicensed spectrum. Furthermore, in order to save power, a concept of a bandwidth part (BWP for short) is proposed for the NR, that is, on a cell or a carrier, only one activated BWP is provided for user equipment (UE for short). For example, one cell or one carrier has a bandwidth of 100 MHz, and the UE sends and receives only on 20 MHz thereof.

Coincidence may be implemented among the BWPs. For each UE, the BWPs activated at different moments may be different. There is only one activated BWP at the same moment for each UE, therefore, in the case of the NR unlicensed spectrum, if detecting that the channel of the activated BWP is always busy, the service of the UE cannot be processed at all times since the channel of the activated BWP is busy and BWP handover signaling cannot be sent. However, no service needs to be processed by other BWP when detecting that the channels of the other BWP is idle, such that the spectrum efficiency of overall system is reduced.

SUMMARY

The present disclosure provides methods and apparatuses for triggering BWP handover, information configuring methods and apparatuses, user equipment, base stations and computer-readable storage media, such that a UE automatically hands over to other BWP to receive data when discovering that a channel on its own activated BWP is busy, such that load balancing between different BWPs and ensuring that services thereof may be processed in time.

According to a first aspect of embodiments of the present disclosure, a method of triggering a BWP handover is provided. The method includes that a UE detects that a channel on an activated BWP for the UE is busy; and the UE automatically hands over to a BWP for the UE other than the activated BWP to receive data.

According to a second aspect of embodiments of the present disclosure, an information configuring method is provided. The method includes that a base station selects, in response to detecting that a channel on an activated BWP of a UE is busy, a candidate BWP with an idle channel and a highest priority from one or more candidate BWPs configured for the UE. Further, the base station sends, via the selected candidate BWP with the idle channel and the highest priority, data to the UE.

According to a third aspect of the embodiments of the present disclosure, a UE is provided. The UE includes a processor and a memory for storing instructions executed by the processor. The processor is configured to detect whether a channel on an activated BWP for the UE is busy and automatically hand over to a BWP for the UE other than the activated BWP to receive data in response to detecting that the channel on the activated BWP for the UE is busy.

According to a fourth aspect of embodiments of the present disclosure, a base station is provided. The base station includes a processor and a memory for storing instructions executed by the processor. The processor is configured to select, in response to detecting that a channel on an activated BWP for a UE is busy, a candidate BWP with an idle channel and a highest priority from one or more candidate BWPs configured for the UE and send, via the selected candidate BWP with the idle channel and the highest priority, data to the UE.

According to a fifth aspect of embodiments of the present disclosure, a non-transitory computer readable storage medium is provided. The non-transitory computer readable storage medium stores a plurality of programs for execution by a UE having one or more processors. Further, the plurality of programs, when executed by the one or more processors, cause the UE to perform acts including: detecting that a channel on an activated BWP for the UE is busy and automatically handing over to a BWP for the UE other than the activated BWP to receive data.

According to a sixth aspect of embodiments of the present disclosure, a non-transitory computer readable storage medium is provided. The non-transitory computer readable storage medium stores a plurality of programs for execution by a base station having one or more processors. Further, the plurality of programs, when executed by the one or more processors, cause the base station to perform acts including: selecting, in response to detecting that a channel on an activated BWP for a UE is busy, a candidate BWP with an idle channel and a highest priority from one or more candidate BWPs configured for the UE; and sending, via the selected candidate BWP with the idle channel and the highest priority, data to the UE.

The technical solutions provided by the embodiments of the present disclosure may include the following beneficial effects.

By detecting that the channel on the activated BWP for the UE is busy and automatically handing over to other BWPs to receive data, load balancing may be performed between different BWPs, and the service of the UE may be processed in time.

By determining the activated BWP and sending the configuration information for the activated BWP to the UE, the UE may hand over to other BWP to receive data when detecting that the channel on the activated BWP is busy, thereby ensuring that the service of the UE may be processed in time.

It should be understood that the above general description and the following detailed description are merely exemplary and explanatory and do not limit the disclosure.

BRIEF DESCRIPTION OF THE DRAWINGS

The accompanying drawings herein are incorporated in and constitute a part of this specification, illustrate embodiments consistent with the disclosure, and together with the description serve to explain the principles of the disclosure.

DETAILED DESCRIPTION OF THE EMBODIMENTS

Exemplary embodiments will be described in detail herein, examples of which are shown in the accompanying drawings. The following description relates to the drawings, unless otherwise indicated, the same numerals in the different figures represent the same or similar elements. The embodiments described in the following exemplary embodiments do not represent all embodiments consistent with the present disclosure. Rather, they are merely examples of devices and methods consistent with some aspects of the disclosure as detailed in the appended claims.

Figure 1:
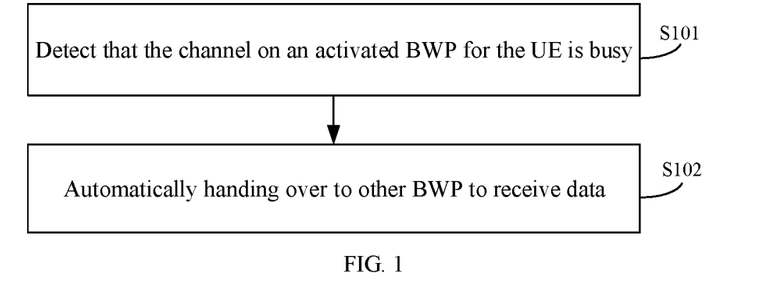
FIG. 1 is a flowchart of a method of triggering BWP handover according to an exemplary embodiment of the present disclosure.

FIG. 1 is a flowchart of a method of triggering BWP handover according to an exemplary embodiment of the present disclosure, and the embodiment is described from a UE side. As shown in FIG. 1, the method of triggering BWP handover includes the following steps.

In step S101, it is detected that the channel on an activated BWP for the UE is busy.

In this embodiment, the UE may monitor a pre-set signal within a pre-set signal monitoring time window configured for the activated BWP by the base station. If none of the pre-set signal is monitored, it indicates that the base station detects that the channel is busy on the activated BWP for the UE and thus the pre-set signal cannot be sent; If the pre-set signal is monitored, it indicates that the base station detects that the channel is idle on the activated BWP for the UE and thus the pre-set signal is sent.

The pre-set signal may include, but is not limited to, a wake up signal (WUS), an initial signal, or a similar wireless fidelity (WIFI) preamble signal, which is used to indicate that the base station detects that the channel on the activated BWP for the UE is idle, wherein the initial signal may include, but is not limited to, a primary synchronization signal (PSS) or a secondary synchronization signal (SSS). The pre-set signal may carry, but is not limited to, at least one of a cell identifier, a BWP identifier, or a UE group identifier to which a respective BWP belongs. The purpose of sending the pre-set signal is to inform the UE that the base station detects that the channel on the BWP is idle, and then the base station will send downlink control signaling on the PDCCH of the BWP. After detecting the pre-set signal, the UE needs to monitor, on the BWP, the downlink control signaling on the PDCCH to obtain uplink and downlink scheduling information sent by the base station.

In step S102, automatic handover to other BWP is performed to receive data.

In this embodiment, the UE may determine a candidate BWP with the idle channel and the highest priority from the candidate BWP(s) configured by the base station, and hand over to the candidate BWP with the idle channel and the highest priority to receive data.

Figure 2:
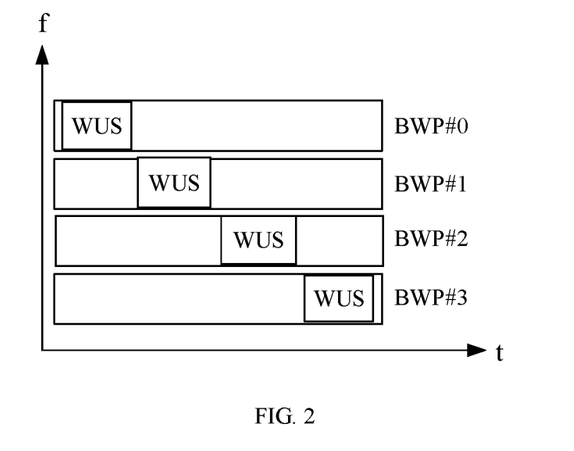
FIG. 2 is a schematic diagram of WUSs on different BWPs according to an exemplary embodiment of the present disclosure.

In addition to configuring the activated BWP for the UE, the base station further configures one or more candidate BWPs, and the activated BWP and each of the candidate BWPs have priorities. For example, the priority of the activated BWP is the highest, and the priorities of other candidate BWPs are different. For example, the activated BWP is BWP #0, the other candidate BWPs are BWP #1 and BWP #2, and the priority order thereof is BWP #0>BWP #1>BWP #2. Furthermore, the base station sets a signal monitoring time window for each BWP, and the UE needs to monitor the pre-set signal on each BWP in the monitoring time window of each BWP. There may be a time interval between the pre-set signals on different BWPs for the BWP handover of the UE, such that the UE only needs to monitor one BWP at the same time, that is, the receiving bandwidth is small and power is saved. There may be no time interval or be overlap time between the pre-set signals on different BWPs, such that the UE needs to monitor a plurality of BWPs at the same time, that is, the receiving bandwidth thereof needs to be increased, and power is consumed. When the pre-set signal is WUS, as shown in FIG. 2, the cell or carrier bandwidth is 80 MHz, and includes four BWPs in total from BWP #0 to BWP #3, where BWP #0 is an activated BWP, BWP #1 to BWP #3 are candidate BWPs, and there are time intervals among WUSs on different BWPs.

Optionally, the UE may receive the configuration information of the candidate BWP(s) and the configuration information of the activated BWP sent by the base station, and the base station may set the priority and the signal monitoring time window for the candidate BWP(s) and the activated BWP.

It should be noted that the transmission order of the pre-set signal, e.g., WUS, of each BWP is not directly related to the priority of each BWP. For example, for UE #1, the currently activated BWP is BWP #0, other candidate BWPs are BWP #1 and BWP #2, and the priority order thereof is BWP #0>BWP #1>BWP #2, and the transmission order of the WUS is also in an order of BWP #0 earlier than BWP #1 and BWP #1 earlier than BWP #2. However, for UE #2, it is possible that the currently activated BWP is BWP #1, the candidate BWPs are BWP #2 and BWP #4, the priority order is BWP #1>BWP #4>BWP #2, and the transmission order of the WUS is in an order of BWP #1 earlier than BWP #2 and BWP #2 earlier than BWP #4.

In this embodiment, determining the candidate BWP with the idle channel and the highest priority from the candidate BWP(s) configured by the base station may include: monitoring a pre-set signal within the pre-set signal monitoring time window corresponding to each candidate BWP, and if the pre-set signal is monitored, it indicates that the idle channel on a corresponding candidate BWP is idle, selecting a candidate BWP with an idle channel and a highest priority from the candidate BWP(s) configured by the base station.

As an example, if a pre-set signal is monitored within the pre-set signal monitoring time window corresponding to the candidate BWP with the highest priority, the candidate BWP with the highest priority is determined as the candidate BWP with the idle channel and the highest priority, that is, when detecting that the channel of the candidate BWP with the highest priority is idle, the other candidate BWP is unnecessary to be detected. As another example, if a pre-set signal is monitored within the pre-set signal monitoring time windows of respective candidate BWPs, a candidate BWP with the highest priority is determined from the candidate BWPs which have monitored the pre-set signal, and a candidate BWP with the highest priority is taken as a candidate BWP with the idle channel and the highest priority, that is, when it is detected that BWP channels are idle, a candidate BWP with the highest priority is selected.

In this embodiment, if the UE detects a pre-set signal, such as WUS, on a BWP with a high priority, it is unnecessary to detect whether WUS exists on a BWP with a low priority. In this embodiment, it is also possible to monitor WUS on the BWP with the low priority first. When pre-set signals such as WUSs on idle channels of BWPs are monitored, the UE needs to be handed over to the candidate BWP with the highest priority of the idle channel to receive data from the base station to itself, for example, downlink control signaling on the PDCCH is received in a control resource set (CORESET for short). After receiving the downlink control signaling on the PDCCH, physical downlink shared channel (PDSCH) reception or physical uplink shared channel (PUSCH) transmission is performed according to information such as time-frequency resources indicated by the downlink control signaling. That is to say, the activated BWP for the UE has been handed over to the candidate BWP with the idle channel and the highest priority.

In the above embodiments, by detecting that the channel on the activated BWP for the UE is busy and automatically handing over to other BWP to receive data, load balancing may be performed between different BWPs to ensure that the service of the UE may be processed in time.

Figure 3:
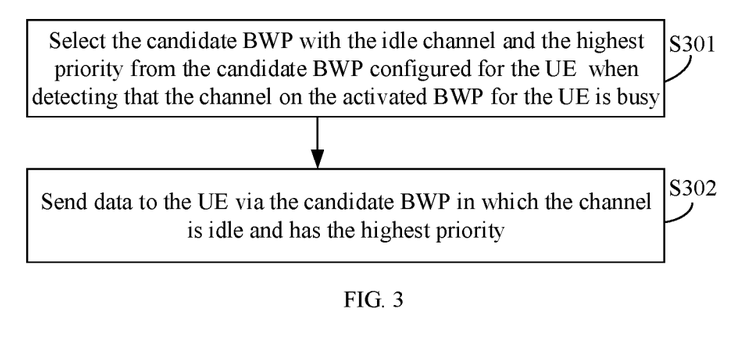
FIG. 3 is a flowchart of an information configuring method according to an exemplary embodiment of the present disclosure.

FIG. 3 is a flowchart of an information configuring method according to an exemplary embodiment of the present disclosure, and the embodiment is described from a base station side. As shown in FIG. 3, the method includes the following steps.

In step S301, when detecting that the channel on the activated BWP for the UE is busy, the candidate BWP with the idle channel and the highest priority is selected from the candidate BWP configured for the UE.

The base station configures a plurality of BWPs for the UE, including information such as a BWP identifier (ID), a frequency domain resource, and the priority of each BWP. However, among the plurality of BWPs, the BWP #1 may be configured as an activated BWP by the base station, and the other BWPs may be candidate BWPs with respect to the activated the BWP.

In step S302, data, via the candidate BWP in which the channel is idle and has the highest priority, is sent to the UE.

Optionally, after determining that the BWP is activated, if the base station detects that the channel on the activated BWP for the UE is idle, the base station may also send a pre-set signal via the activated BWP to indicate that the channel on the activated BWP for the UE is idle.

In this embodiment, when detecting that the channel on the activated BWP for the UE is idle, the base station sends a pre-set signal first to indicate that the channel is idle. Then, when monitoring the pre-set signal in the configured pre-set signal monitoring time window, the UE knows that the channel is idle, and detects the PDCCH in the next CORESET. If none of the pre-set signal is monitored within the configured pre-set signal monitoring time window, which means that the channel is busy, it is unnecessary to detect the next signal.

In addition, optionally, the method may further include: an activated BWP and a candidate BWP are configured for the UE, a priority and a signal monitoring time window are set for the candidate BWP and the activated BWP, and configuration information, configuration information of the candidate BWP, and a priority and a pre-set signal monitoring time window set for the candidate BWP and the activated BWP are sent to UE.

In this embodiment, in addition to configuring the UE with the activated BWP, the base station further configures one or more candidate BWPs, and the activated BWP and each of the candidate BWPs have priorities, for example, the priority of the activated BWP is the highest, and the priorities of other candidate BWPs are different. For example, the activated BWP is BWP #0, the other candidate BWPs are BWP #1 and BWP #2, and the priority order thereof is BWP #0>BWP #1>BWP #2. Furthermore, the base station sets a signal monitoring time window for each BWP, and the UE needs to monitor the pre-set signal on each BWP in the monitoring time window of each BWP. A time interval may exist between the pre-set signals on different BWPs for the BWP handover of the UE, such that the UE only needs to monitor one BWP at the same time, that is, the receiving bandwidth is small, and power is saved. There may be no time interval or be overlap time between the pre-set signals on different BWPs, such that the UE needs to monitor a plurality of BWPs at the same time, that is, the receiving bandwidth thereof needs to be increased, and power is consumed. When the pre-set signal is WUS, as shown in FIG. 2, the cell or carrier bandwidth is 80 MHz, and includes four BWPs in total from BWP #0 to BWP #3, where BWP #0 is an activated BWP, BWP #1 to BWP #3 are candidate BWPs, and there are time intervals among WUSs on different BWPs.

In this embodiment, the base station detects that the channel on the activated BWP for the UE is busy, the method may further include: detecting whether a channel on each candidate BWP is idle; and sending the pre-set signal via the candidate BWP of the idle channel, such that the UE monitors the pre-set signal within the pre-set signal monitoring time window corresponding to each candidate BWP. If the pre-set signal is monitored, it indicates that the channel on the corresponding candidate BWP is idle, such that the UE selects a candidate BWP with the idle channel and the highest priority from the candidate BWP(s) configured by the base station.

In this embodiment, when detecting that the channel on the activated BWP for the UE is busy, the base station selects a candidate BWP with the idle channel and the highest priority from the candidate BWPs configured for the UE; and send data to the UE on the BWP with the idle channel and the highest priority. For example, the downlink control signaling of the UE is sent on the PDCCH in the CORESET of the candidate BWP with the highest priority and the idle channel. The downlink control signaling is used to instruct the base station to schedule time-frequency resources for PDSCH reception or PUSCH transmission to the UE.

In this embodiment, the priority of each BWP is set in order to make the behavior of the base station and the UE uniform. If the channels on the candidate BWPs are idle, among the candidate BWPs with the idle channels, the base station selects a candidate BWP with the highest priority to send data of the UE. For example, the downlink control signaling of the UE is sent on the PDCCH in the CORESET of the candidate BWP with the highest priority and the idle channel. The downlink control signaling is used to instruct the base station to schedule time-frequency resources for PDSCH reception or PUSCH transmission to the UE. The UE also needs to receive the downlink control signaling on its own PDCCH in the CORESET on the candidate BWP with the highest priority and idle channel according to the condition of the monitoring pre-set signal such as WUS. After receiving the downlink control signaling on the PDCCH, the UE performs PDSCH reception or PUSCH transmission according to information such as time-frequency resources indicated by the downlink control signaling. The priority of the activated BWP is higher than the priorities of all candidate BWPs.

In the above embodiment, the channel on the activated BWP for the UE is detected to be busy, and the candidate BWP with the idle channel and the highest priority is selected from the candidate BWP of the UE, and data is sent to the UE via the selected candidate BWP with the idle channel and the highest priority. Thus, the UE may detect that the channel on its activated BWP is busy, and automatically hand over to other BWP to receive data, thereby ensuring that its service may be processed in time.

Figure 4:
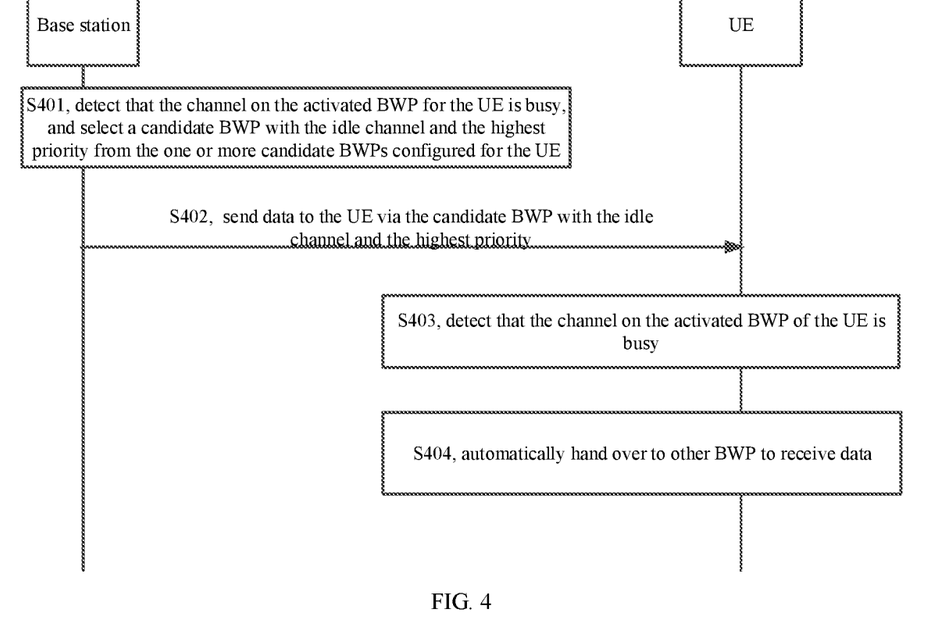
FIG. 4 is a signaling flowchart of a method of triggering BWP handover according to an exemplary embodiment of the present disclosure.

FIG. 4 is a signaling flowchart of a method of triggering BWP handover according to an exemplary embodiment of the present disclosure, and the embodiment is described from the perspective of interaction between a base station and a UE. As shown in FIG. 4, the method includes the following steps.

In step S401, the base station detects that the channel on the activated BWP for the UE is busy, and selects a candidate BWP with the idle channel and the highest priority from the one or more candidate BWPs configured for the UE.

In step S402, the base station sends data to the UE via the candidate BWP with the idle channel and the highest priority.

In step S403, the UE detects that the channel on the activated BWP for the UE is busy.

In step S404, the UE automatically hands over to other BWP to receive data.

In the foregoing embodiment, through interaction between the base station and the UE, the UE automatically hands over to other BWP to receive data when detecting that the channel on its activated BWP is busy, such that load balancing may be performed between different BWPs and the service of the UE may be processed in time.

Figure 5:
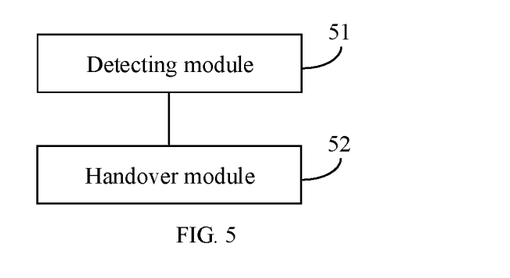
FIG. 5 is a block diagram of an apparatus for triggering BWP handover according to an exemplary embodiment.

FIG. 5 is a block diagram of an apparatus for triggering BWP handover according to an exemplary embodiment. The apparatus may be located in a UE, as shown in FIG. 5. The apparatus includes a detecting module 51 and a handover module 52.

The detecting module 51 is configured to detect whether a channel on the activated BWP for the UE is busy.

In this embodiment, the UE may monitor the pre-set signal within the pre-set signal monitoring time window configured for the activated BWP by the base station. If none of the pre-set signal is monitored, it indicates that the base station detects that the channel is busy on the activated BWP for the UE, and thus the pre-set signal cannot be sent; if the pre-set signal is monitored, it indicates that the base station detects that the channel is idle on the activated BWP for the UE, and thus the pre-set signal is sent.

The pre-set signal may include, but is not limited to, a wake up signal (WUS), an initial signal, or a similar wireless fidelity (WIFI) preamble signal, which is used to indicate that the base station detects that the channel on the activated BWP for the UE is idle, wherein the initial signal may include, but is not limited to, a primary synchronization signal (PSS) or a secondary synchronization signal (SSS). The pre-set signal may carry, but is not limited to, at least one of a cell identifier, a BWP identifier, and a UE group identifier to which a respective BWP belongs. The purpose of sending the pre-set signal is to inform the UE that the base station detects that the channel on the BWP is idle, and then the base station will send downlink control signaling on the PDCCH of the BWP. After detecting the pre-set signal, the UE needs to monitor, on the BWP, the downlink control signaling on the PDCCH to obtain uplink and downlink scheduling information sent by the base station.

The handover module 52 is configured to automatically hand over to other BWP to receive data when the detecting module 51 detects that the channel on the activated BWP for the UE is busy.

In this embodiment, the UE may determine the candidate BWP with the idle channel and the highest priority from the candidate BWP(s) configured by the base station, and hand over to the candidate BWP with the idle channel and the highest priority to receive data.

In addition to configuring the activated BWP for the UE, the base station further configures one or more candidate BWPs, and the activated BWP and each of the candidate BWPs have priorities. For example, the priority of the activated BWP is the highest, and the priorities of other candidate BWPs are different. For example, the activated BWP is BWP #0, the other candidate BWPs are BWP #1 and BWP #2, and the priority order thereof is BWP #0>BWP #1>BWP #2. Furthermore, the base station sets a signal monitoring time window for each BWP, and the UE needs to monitor the pre-set signal on each BWP in the monitoring time window of each BWP. There may be a time interval between the pre-set signals on different BWPs for the BWP handover of the UE, such that the UE only needs to monitor one BWP at the same time, that is, the receiving bandwidth is small and power is saved. There may be no time interval or be overlap time between the pre-set signals on different BWPs, such that the UE needs to monitor a plurality of BWPs at the same time, that is, the receiving bandwidth thereof needs to be increased, and power is consumed. When the pre-set signal is WUS, as shown in FIG. 2, the cell or carrier bandwidth is 80 MHz, and includes four BWPs in total from BWP #0 to BWP #3, where BWP #0 is an activated BWP, BWP #1 to BWP #3 are candidate BWPs, and there are time intervals among WUSs on different BWPs.

Optionally, the UE may receive the configuration information of the candidate BWP(s) and the configuration information of the activated BWP sent by the base station, and the base station may set the priority and the signal monitoring time window for the candidate BWP(s) and the activated BWP.

It should be noted that the transmission order of the pre-set signal, e.g., WUS, of each BWP is not directly related to the priority of each BWP. For example, for UE #1, the currently activated BWP is BWP #0, other candidate BWPs are BWP #1 and BWP #2, and the priority order thereof is BWP #0>BWP #1>BWP #2, and the transmission order of the WUS is also in an order of BWP #0 earlier than BWP #1 and BWP #1 earlier than BWP #2. However, for UE #2, it is possible that the currently activated BWP is BWP #1, the candidate BWPs are BWP #2 and BWP #4, the priority order is BWP #1>BWP #4>BWP #2, and the transmission order of the WUS is in an order of BWP #1 earlier than BWP #2 and BWP #2 earlier than BWP #4.

In this embodiment, determining the candidate BWP with idle channel and the highest priority from the candidate BWP(s) configured by the base station may include: monitoring the pre-set signal within the pre-set signal monitoring time window corresponding to each candidate BWP, and if the pre-set signal is monitored, it indicates that the idle channel on a corresponding candidate BWP is idle, selecting a candidate BWP with an idle channel and a highest priority from the candidate BWP(s) configured by the base station.

As an example, if the pre-set signal is monitored within the pre-set signal monitoring time window corresponding to the candidate BWP with the highest priority, the candidate BWP with the highest priority is determined as the candidate BWP with the idle channel and the highest priority, i. e., when detecting that the channel of the candidate BWP with the highest priority is idle, the other candidate BWP is unnecessary to be detected. As another example, if a pre-set signal is monitored within the pre-set signal monitoring time windows of respective candidate BWPs, a candidate BWP with the highest priority is determined from the candidate BWPs which have monitored the pre-set signal, and a candidate BWP with the highest priority is taken as a candidate BWP with the idle channel and the highest priority, that is, when it is detected that BWP channels are idle, a candidate BWP with the highest priority is selected.

In this embodiment, if the UE detects a pre-set signal, such as WUS, on a BWP with a high priority, it is unnecessary to detect whether WUS exists on a BWP with a low priority. In this embodiment, it is also possible to monitor WUS on the BWP with the low priority first. When pre-set signals such as WUSs on idle channels of BWPs are monitored, the UE needs to hand over to the candidate BWP with the highest priority of the idle channel to receive data by itself from the base station, for example, downlink control signaling on the PDCCH is received in a control resource set (CORESET for short). After receiving the downlink control signaling on the PDCCH, physical downlink shared channel (PDSCH) reception or physical uplink shared channel (PUSCH) transmission is performed according to information such as time-frequency resources indicated by the downlink control signaling. That is to say, the activated BWP for the UE has been handed over to the candidate BWP with the idle channel and the highest priority.

In the above embodiments, by detecting that the channel on the activated BWP for the UE is busy and automatically handing over to other BWP to receive data, load balancing may be performed between different BWPs to ensure that the service of the UE may be processed in time.

Figure 6:
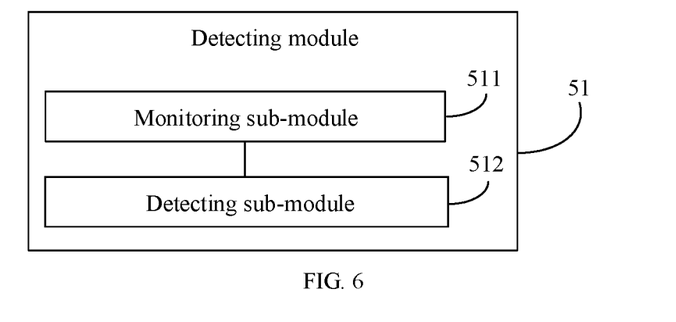
FIG. 6 is a block diagram of another apparatus for triggering BWP handover according to an exemplary embodiment.

FIG. 6 is a block diagram of another apparatus for triggering BWP handover according to an exemplary embodiment. As shown in FIG. 6, on the basis of the embodiment shown in FIG. 5, the detecting module 51 may include the following sub-modules.

A monitoring sub-module 511 is configured to monitor a pre-set signal within a pre-set signal monitoring time window configured for the activated BWP by a base station.

A detecting sub-module 512 is configured to detect that the channel on the activated BWP for the UE is busy if the monitoring sub-module 511 does not monitor the pre-set signal.

In the above embodiments, the pre-set signal is monitored within the pre-set signal monitoring time window configured for the activated BWP by the base station, and when none of the pre-set signal is monitored, the channel on the activated BWP for the UE is detected to be busy, in such a way that the implementation is simple.

Figure 7:
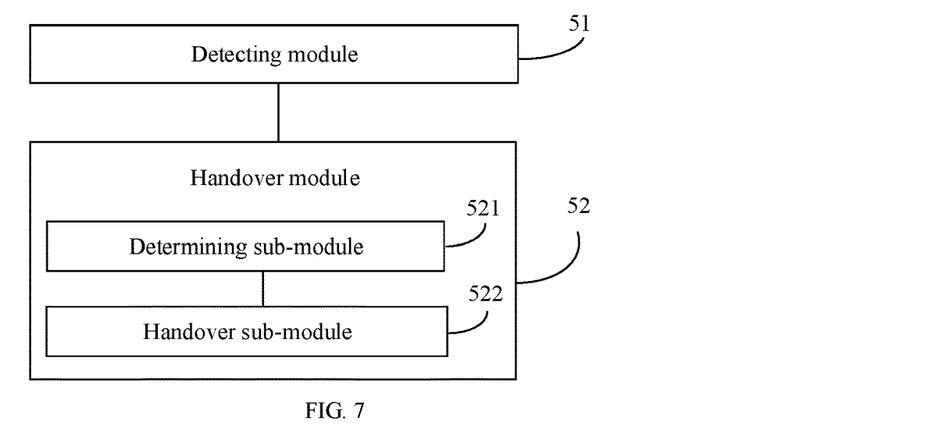
FIG. 7 is a block diagram of another apparatus for triggering BWP handover according to an exemplary embodiment.

FIG. 7 is a block diagram of another apparatus for triggering BWP handover according to an exemplary embodiment. As shown in FIG. 7, on the basis of the embodiment shown in FIG. 5, the handover module 52 may include the following sub-modules.

A determining sub-module 521 is configured to determine a candidate BWP with the idle channel and the highest priority from one or more candidate BWPs configured by the base station.

A handover sub-module 522 is configured to hand over to the candidate BWP with the idle channel and the highest priority determined by the determining sub-module 521 to receive data.

In the above embodiment, the candidate BWP with the idle channel and the highest priority is determined, and data is received by handing over to the determined candidate BWP with the idle channel and the highest priority, thereby ensuring that its own service may be processed in time.

Figure 8:
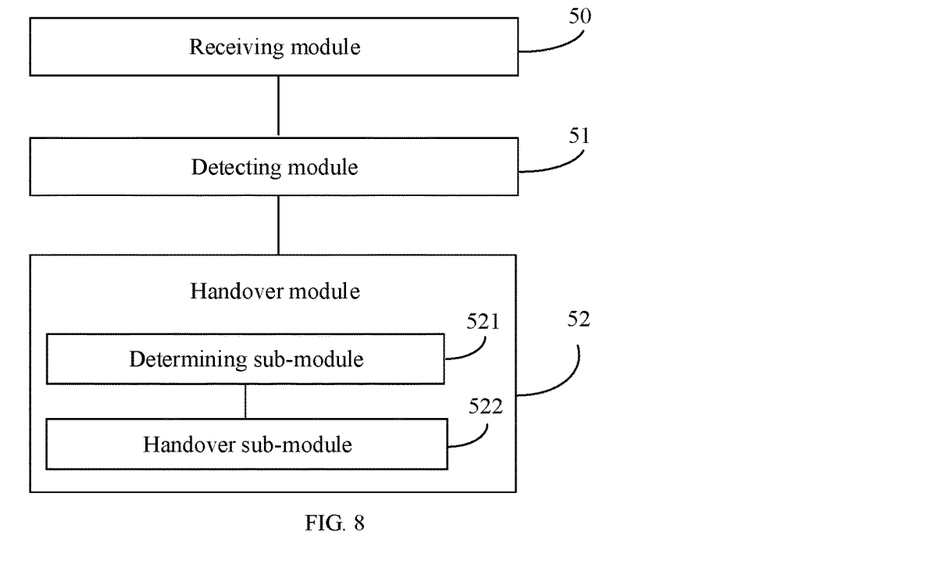
FIG. 8 is a block diagram of another apparatus for triggering BWP handover according to an exemplary embodiment.

FIG. 8 is a block diagram of another apparatus for triggering BWP handover according to an exemplary embodiment. As shown in FIG. 8, on the basis of the embodiment shown in FIG. 7, the apparatus may further include a receiving module 50.

The receiving module 50 is configured to receive configuration information of the candidate BWPs and configuration information of the activated BWP from the base station, and receive a priority and a pre-set signal monitoring time window set by the base station for the candidate BWPs and the activated BWP respectively.

In the above embodiment, by receiving configuration information of the candidate BWPs and configuration information of the activated BWP from the base station, and receiving a priority and a pre-set signal monitoring time window set by the base station for the candidate BWPs and the activated BWP respectively, in a such way that a condition is provided for subsequently detecting whether the channel on the BWP is busy.

Figure 9:
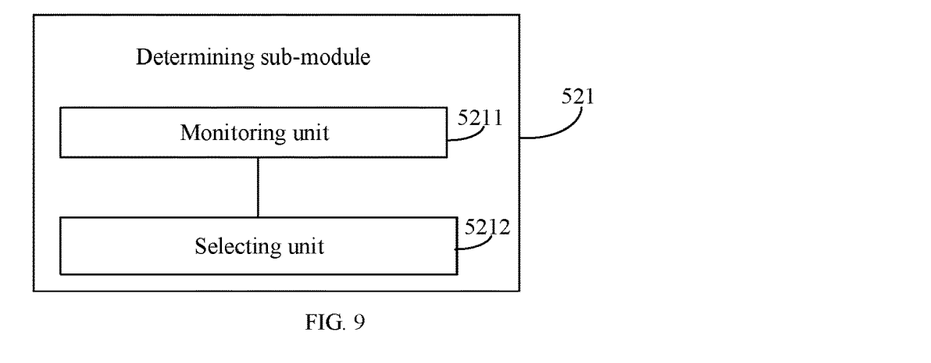
FIG. 9 is a block diagram of another triggering apparatus for triggering BWP handover according to an exemplary embodiment.

FIG. 9 is a block diagram of another triggering apparatus for triggering BWP handover according to an exemplary embodiment. As shown in FIG. 9, on the basis of the embodiment shown in FIG. 8, the determining sub-module 521 may include the following units.

A monitoring unit 5211 is configured to, for each of the candidate BWPs, monitor a pre-set signal within the pre-set signal monitoring time window corresponding to the candidate BWP, and detecting that a channel on the candidate BWP is idle when the pre-set signal is monitored.

A selecting unit 5212 is configured to select a candidate BWP with the idle channel and a highest priority from the candidate BWPs configured by the base station.

In the foregoing embodiment, by selecting a candidate BWP with the idle channel and the highest priority, a condition is provided for subsequently automatically handing over to received data via the candidate BWP.

Figure 10:
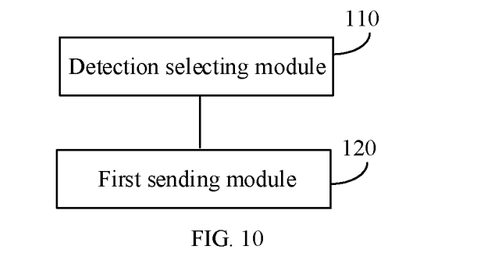
FIG. 10 is a block diagram of an information configuring apparatus according to an exemplary embodiment.

FIG. 10 is a block diagram of an information configuring apparatus according to an exemplary embodiment. The apparatus may be located in a base station, as shown in FIG. 10, the apparatus includes a detection selecting module 110 and a first sending module 120.

The detection selecting module 110 is configured to, when detecting that a channel on an activated bandwidth part BWP of user equipment (UE) is busy, a candidate BWP with an idle channel and a highest priority from one or more candidate BWPs configured for the UE.

The base station configures a plurality of BWPs for the UE, including information such as a BWP identifier (ID), a frequency domain resource, and the priority of each BWP. However, among the plurality of BWPs, the BWP #1 may be configured as an activated BWP by the base station, and the other BWPs may be candidate BWPs with respect to the activated BWP.

The first transmission module 120 is configured to send data to the UE via the candidate BWP with the idle channel and the highest priority selected by the detection selecting module 110.

In the above embodiment, by determining the activated BWP and sending the configuration information for the activated BWP to the UE, the UE may automatically hand over to other BWP to receive data when detecting that the channel on the activated BWP is busy, thereby ensuring that the service of the UE may be processed in time.

Figure 11:
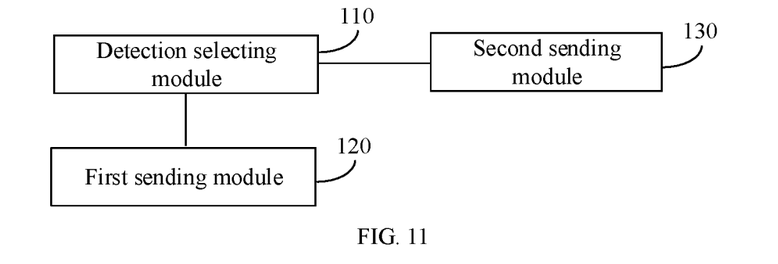
FIG. 11 is a block diagram of another information configuring apparatus according to an exemplary embodiment.

FIG. 11 is a block diagram of another information configuring apparatus according to an exemplary embodiment. As shown in FIG. 11, on the basis of the embodiment shown in FIG. 10, the apparatus may further include a second sending module.

The second sending module 130 is configured to send a pre-set signal via the activated BWP when detecting that the channel on the activated BWP is idle.

After determining the activated BWP, if the base station detects that the channel on the activated BWP for the UE is idle, the base station may also send a set signal via the activated BWP to indicate that the channel on the activated BWP for the UE is idle.

In the above embodiment, the UE detects whether the channel for the activated BWP is idle by sending the pre-set signal via the activated BWP.

Figure 12:
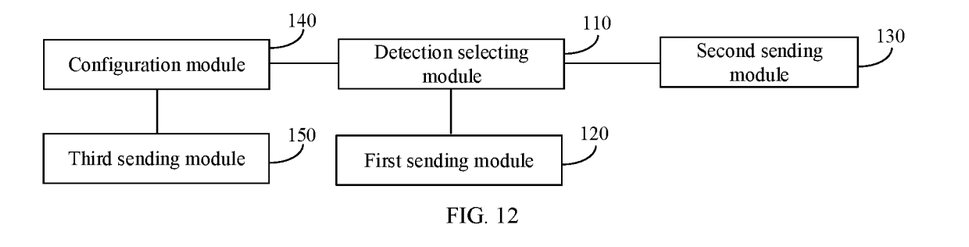
FIG. 12 is a block diagram of another information configuring apparatus according to an exemplary embodiment.

FIG. 12 is a block diagram of another information configuring apparatus according to an exemplary embodiment.

As shown in FIG. 12, on the basis of the embodiment shown in FIG. 10 or FIG. 11, the apparatus may further include the following modules.

A configuration module 140 is configured to configure the activated BWP and the candidate BWPs for the UE, and set a priority and a pre-set signal monitoring time window for the candidate BWPs and the activated BWP respectively.

A third sending module 150 is configured to send configuration information of the activated BWP, configuration information of the candidate BWPs, and the priority and the pre-set signal monitoring time window set for the candidate BWPs and the activated BWP to the UE.

In the foregoing embodiment, the activated BWP and the candidate BWP are configured for the UE, and the priority and the set signal monitoring time window are set for the candidate BWP and the activated BWP, and then the configuration information of the activated BWP, the configuration information of the candidate BWP and the priority and the set signal monitoring time window configured by the configuration module 140 are sent to the UE, which facilitates the UE to detects whether the channel on the BWP is idle.

Figure 13:
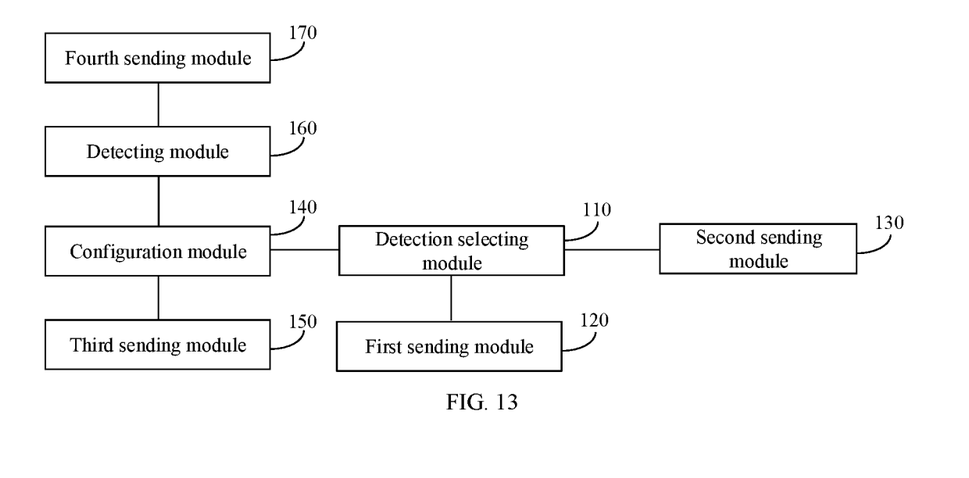
FIG. 13 is a block diagram of another information configuring apparatus according to an exemplary embodiment.

FIG. 13 is a block diagram of another information configuring apparatus according to an exemplary embodiment. As shown in FIG. 13, on the basis of the embodiment shown in FIG. 12, the apparatus may further include a detecting module 160 and a fourth sending module 170.

The detecting module 160 is configured to detect, for each of the candidate BWPs, whether a channel on the candidate BWP is idle.

The fourth sending module 170 is configured to send a pre-set signal via the candidate BWP of the idle channel detected by the detecting module 160.

In this embodiment, if there are idle channels on the BWPs, the base station selects a BWP with the highest priority from the idle BWPs to send data of the UE.

In the above embodiment, the data of the UE is sent over the determined channel of the candidate BWP with the highest priority, such that the base station and the terminal achieves consensus, that is, the base station sends data associated with the UE on the BWP with the idle channel and the highest priority, such as PDCCH, and the UE also knows that the signal is received on the BWP with the idle channel and the highest priority, such as the signal on the PDCCH.

Figure 14:
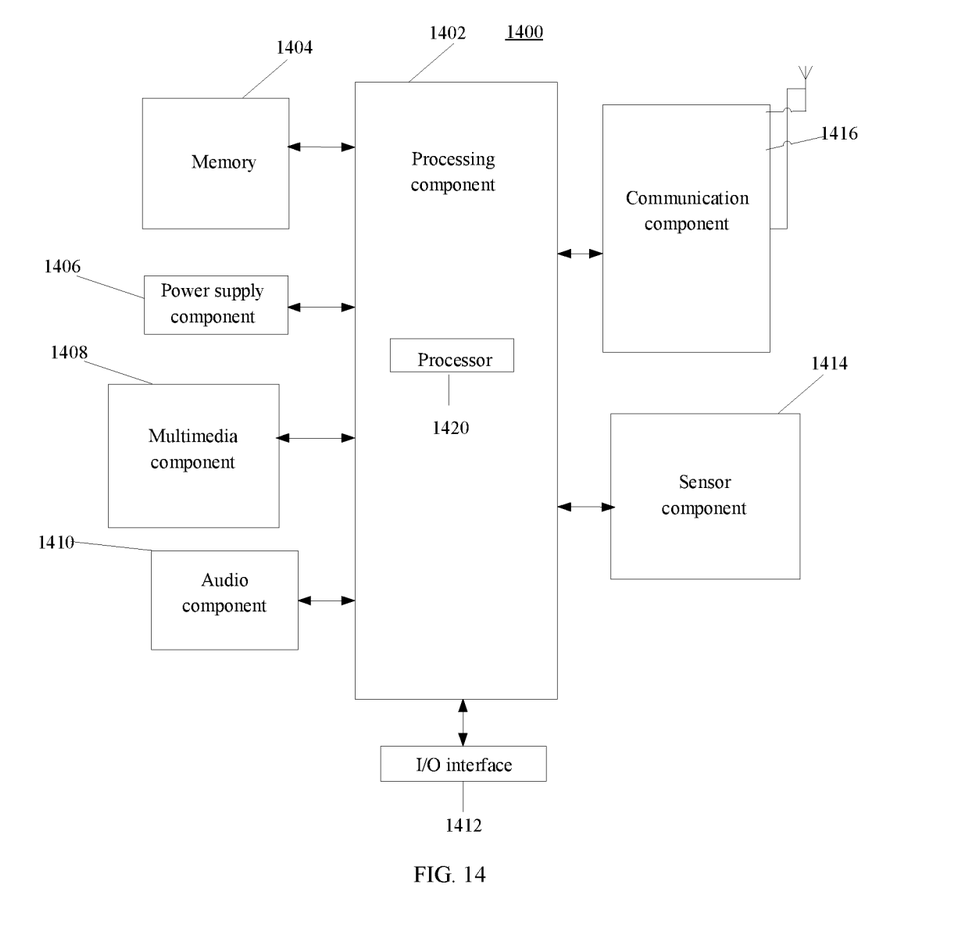
FIG. 14 is a block diagram applicable to an apparatus for triggering BWP handover according to an exemplary embodiment.

FIG. 14 is a block diagram applicable to an apparatus for triggering BWP handover according to an exemplary embodiment. For example, the apparatus 1400 may include user equipment such as mobile phones, computers, digital broadcasted terminals, message transceivers, game consoles, tablet devices, medical devices, fitness devices and personal digital assistants.

Referring to FIG. 14, the apparatus 1400 may include one or more of the following components: a processing component 1402, a memory 1404, a power supply component 1406, a multimedia component 1408, an audio component 1410, an input/output (I/O) interface 1412, a sensor component 1414, and a communication component 1416.

The processing component 1402 generally controls overall operations of the apparatus 1400, such as operations associated with display, phone calls, data communications, camera operations, and recording operations. The processing component 1402 may include one or more processors 1420 to execute instructions to implement all or part of the steps of the above method embodiments implemented by UE 20. In addition, the processing component 1402 may include one or more modules which facilitate the interaction between the processing component 1402 and other components. For example, the processing component 1402 may include a multimedia module to facilitate the interaction between the multimedia component 1408 and the processing component 1402.

One of the processors 1420 in the processing component 1402 may be configured to:
 detect channel busy on the activated BWP for the UE, and automatically hand over to other BWP to receive data.

The memory 1404 is configured to store various types of data to support the operation of the apparatus 1400. Examples of such data include instructions for any application or method operated on the apparatus 1400, contact data, phonebook data, messages, pictures, videos, and so on. The memory 1404 may be implemented by any type of volatile or non-volatile storage devices or a combination thereof, such as a Static Random-Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic or optical disk.

The power supply component 1406 provides power to different components of the apparatus 1400. The power supply component 1406 may include a power management system, one or more power supplies, and other components associated with generating, managing, and distributing power for the apparatus 1400.

The multimedia component 1408 includes a screen providing an output interface between the apparatus 1400 and a user. In some examples, the screen may include a Liquid Crystal Display (LCD) and a Touch Panel (TP). If the screen includes the TP, the screen may be implemented as a touch screen to receive input signals from the user. The TP may include one or more touch sensors to sense touches, swipes, and gestures on the TP. The touch sensors may not only sense a boundary of a touch or swipe, but also sense a duration and a pressure associated with the touch or swipe. In some examples, the multimedia component 1408 may include a front camera and/or a rear camera. The front camera and/or rear camera may receive external multimedia data when the apparatus 1400 is in an operating mode, such as a photographing mode or a video mode. Each of the front camera and the rear camera may be a fixed optical lens system or have focal length and optical zooming capability.

The audio component 1410 is configured to output and/or input an audio signal. For example, the audio component 1410 includes a microphone (MIC). When the apparatus 1400 is in an operating mode, such as a call mode, a recording mode, and a voice recognition mode, the MIC is configured to receive an external audio signal. The received audio signal may be further stored in the memory 1404 or sent via the communication component 1416. In some examples, the audio component 1410 further includes a speaker to output an audio signal.

The I/O interface 1412 may provide an interface between the processing component 1402 and peripheral interface modules. The above peripheral interface modules may include a keyboard, a click wheel, buttons and so on. These buttons may include, but are not limited to, a home button, a volume button, a starting button and a locking button.

The sensor component 1414 includes one or more sensors to provide status assessments of various aspects for the apparatus 1400. For example, the sensor component 1414 may detect the on/off status of the apparatus 1400, and relative positioning of component, for example, the component is a display and a keypad of the apparatus 1400. The sensor component 1414 may also detect a change in position of the apparatus 1400 or a component of the apparatus 1400, a presence or absence of the contact between a user and the apparatus 1400, an orientation or an acceleration/deceleration of the apparatus 1400, and a change in temperature of the apparatus 1400. The sensor component 1414 may include a proximity sensor to detect the presence of a nearby object without any physical contact. The sensor component 1414 may further include an optical sensor, such as a Complementary Metal-Oxide-Semiconductor (CMOS) or Charged Coupled Device (CCD) image sensor which is used in imaging applications. In some examples, the sensor component 1414 may further include an acceleration sensor, a gyroscope sensor, a magnetic sensor, a pressure sensor, or a temperature sensor.

The communication component 1416 is configured to facilitate wired or wireless communication between the apparatus 1400 and other devices. The apparatus 1400 may access a wireless network that is based on a communication standard, such as Wi-Fi, 2G or 3G, or a combination thereof. In an example, the communication component 1416 receives a broadcasted signal or broadcast-associated information from an external broadcasted management system via a broadcasted channel. In an example, the communication component 1416 further includes a Near Field Communication (NFC) module to facilitate short-range communications. For example, the NFC module may be implemented based on a Radio Frequency Identification (RFID) technology, an Infrared Data Association (IrDA) technology, an Ultra-Wideband (UWB) technology, a Bluetooth® (BT) technology and other technologies.

In an example, the apparatus 1400 may be implemented by one or more Application Specific Integrated Circuits (ASIC), Digital Signal Processors (DSP), Digital Signal Processing Devices (DSPD), programmable Logic Devices (PLD), Field Programmable Gate Arrays (FPGA), controllers, microcontrollers, microprocessors, or other electronic components for performing the above method.

In an example, there is also provided a non-transitory machine-readable storage medium including instructions, such as a memory 1404 including instructions. The above instructions may be executed by the processor 1420 of the apparatus 1400 to perform the above methods embodiments implemented by UE 20. For example, the non-transitory machine-readable storage media may include a Read-Only Memory (ROM), a Random-Access Memory (RAM), a Compact disc ROM (CD-ROM), a magnetic tape, a floppy disk, an optical data storage device and so on.

Figure 15:
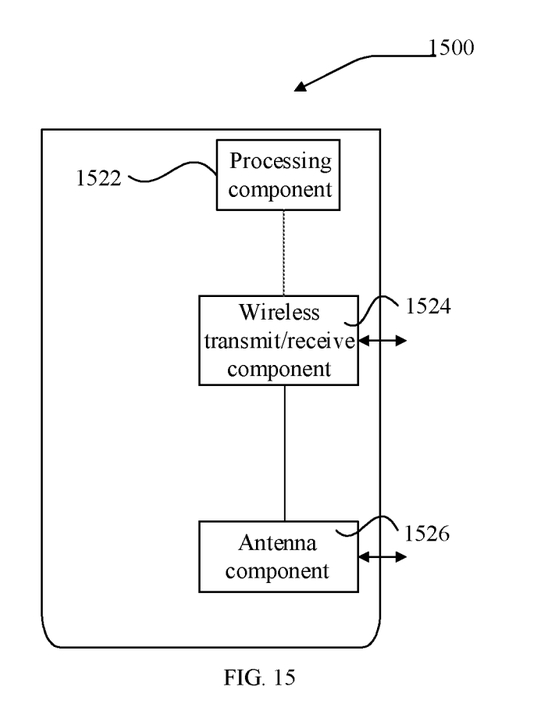
FIG. 15 is a block diagram applicable to an information configuring apparatus according to an exemplary embodiment.

FIG. 15 is a block diagram applicable to an information configuring apparatus according to an exemplary embodiment. The apparatus 1500 may be provided as a base station. Referring to FIG. 15, the apparatus 1500 includes a processing component 1522, a wireless transmit/receive component 1524, an antenna component 1526, and a wireless interface-specific signal processing portion, and the processing component 1522 may further include one or more processors.

One of the processors in the processing component 1522 may be configured to:
 select, when detecting that a channel on an activated bandwidth part BWP of user equipment (UE) is busy, a candidate BWP with an idle channel and a highest priority from one or more candidate BWPs configured for the UE; and
 send, via the selected candidate BWP with the idle channel and the highest priority, data to the UE.

In an exemplary embodiment, a non-transitory computer-readable storage medium is also provided, which includes instructions executed by the processing component 1522 of the apparatus 1500 to implement the information configuring method. For example, the non-transitory computer-readable storage medium may be a ROM, a random access memory (RAM), a CD-ROM, a magnetic tape, a floppy disk, an optical data storage device, and the like.

Since the device examples substantially correspond to the method examples, a reference may be made to part of the descriptions of the method examples for the related part. The device examples described above are merely illustrative, where the units described as separate members may be or not be physically separated, and the members displayed as units may be or not be physical units, i.e., may be located in one place, or may be distributed to a plurality of network units. Part or all of the modules may be selected according to actual requirements to implement the objectives of the solutions in the examples. Those of ordinary skill in the art may understand and carry out them without creative work.

It shall be noted that the relational terms such as "first" and "second" used herein are merely intended to distinguish one entity or operation from another entity or operation rather than to require or imply any such actual relation or order existing between these entities or operations. Also, the term "including", "containing" or any variation thereof is intended to encompass non-exclusive inclusion, such that a process, method, article or device including a series of elements includes not only those elements but also other elements not listed explicitly or those elements inherent to such a process, method, article or device. Without more limitations, an element defined by the statement "including a . . . " shall not be precluded to include additional same elements present in a process, method, article or device including the elements.

Other implementations of the present disclosure will be apparent to those skilled in the art from consideration of the specification and practice of the present disclosure herein. The present disclosure is intended to cover any variations, uses, modification or adaptations of the present disclosure that follow the general principles thereof and include common knowledge or conventional technical means in the art that are not disclosed in the present disclosure. The specification and examples are considered as exemplary only, with a true scope and spirit of the present disclosure being indicated by the following claims.

It is to be understood that the present disclosure is not limited to the precise structure described above and shown in the accompanying drawings, and that various modifications and changes may be made without departing from the scope thereof. The scope of the present disclosure is limited only by the appended claims.

The invention claimed is:

1. A method of triggering a bandwidth part (BWP) handover, comprising:
    detecting, by a user equipment (UE), that a channel on an activated BWP for the UE is busy; and
    automatically handing over, by the UE, to a BWP for the UE other than the activated BWP to receive data;
    wherein detecting that the channel on the activated BWP for the UE is busy comprises:
    monitoring a pre-set signal within a pre-set signal monitoring time window configured for the activated BWP by a base station; and
    in response to determining that the pre-set signal is not monitored, detecting that the channel on the activated BWP for the UE is busy.

2. The method according to claim 1, wherein automatically handing over to the BWP for the UE other than the activated BWP to receive data comprises:
    determining, from one or more candidate BWPs configured by a base station, a candidate BWP with an idle channel and a highest priority; and
    handing over to the determined candidate BWP with the idle channel and the highest priority to receive data.

3. The method according to claim 2, further comprising:
    receiving configuration information of the one or more candidate BWPs and configuration information of the activated BWP from the base station, and
    receiving a priority and a pre-set signal monitoring time window respectively set by the base station for the one or more candidate BWPs and the activated BWP.

4. The method according to claim 3, wherein determining the candidate BWP with the idle channel and the highest priority from the one or more candidate BWPs configured by the base station comprises:
    for each of the one or more candidate BWPs,
        monitoring the pre-set signal within the pre-set signal monitoring time window corresponding to the candidate BWP, and
        detecting that a channel on the candidate BWP corresponding to the pre-set signal is idle in response to determining that the pre-set signal is monitored; and
    selecting the candidate BWP with the idle channel and the highest priority from the one or more candidate BWPs configured by the base station.

5. The method according to claim 1, wherein
    the pre-set signal comprises a wake-up signal (WUS) or an initial signal, and
    the pre-set signal carries at least one of following identifiers: a cell identifier, a BWP identifier, or a UE group identifier related to a BWP corresponding to the pre-set signal.

6. A user equipment (UE), comprising:
    a processor; and
    a memory for storing instructions executed by the processor;
    wherein the processor is configured to:
    detect whether a channel on an activated bandwidth part (BWP) for the UE is busy; and
    automatically hand over to a BWP for the UE other than the activated BWP to receive data in response to detecting that the channel on the activated BWP for the UE is busy;
    wherein the processor is further configured to:
    monitor a pre-set signal within a pre-set signal monitoring time window configured for the activated BWP by a base station; and
    detect that the channel on the activated BWP for the UE is busy in response to determining that the pre-set signal is not monitored.

7. The UE according to claim 6, wherein the processor is further configured to:
    determine a candidate BWP with an idle channel and a highest priority from one or more candidate BWPs configured by a base station; and
    hand over to the determined candidate BWP with the idle channel and the highest priority to receive data.

8. The UE according to claim 7, the processor is further configured to:
    receive configuration information of the one or more candidate BWPs and configuration information of the activated BWP from the base station, and receive a priority and a pre-set signal monitoring time window respectively set by the base station for the one or more candidate BWPs and the activated BWP.

9. The UE according to claim 8, wherein the processor is configured to:
for each of the one or more candidate BWPs,
monitor the pre-set signal within the pre-set signal monitoring time window corresponding to each candidate BWP, and
detect that a channel on the candidate BWP corresponding to the pre-set signal is idle in response to determining that the pre-set signal is monitored; and
select the candidate BWP with the idle channel and the highest priority from the one or more candidate BWPs configured by the base station.

10. The UE according to claim 6, wherein
the pre-set signal comprises a wake-up signal (WUS) or an initial signal, and
the pre-set signal carries at least one of following identifiers: a cell identifier, a BWP identifier, or a UE group identifier related to a BWP corresponding to the pre-set signal.

* * * * *